Sept. 3, 1963 G. W. GREGORY ET AL 3,102,447
PLASTIC SCREW TYPE TEMPORARY FASTENER FOR
ANCHOR TYPE NUT PLATE OR THE LIKE
Filed March 28, 1960
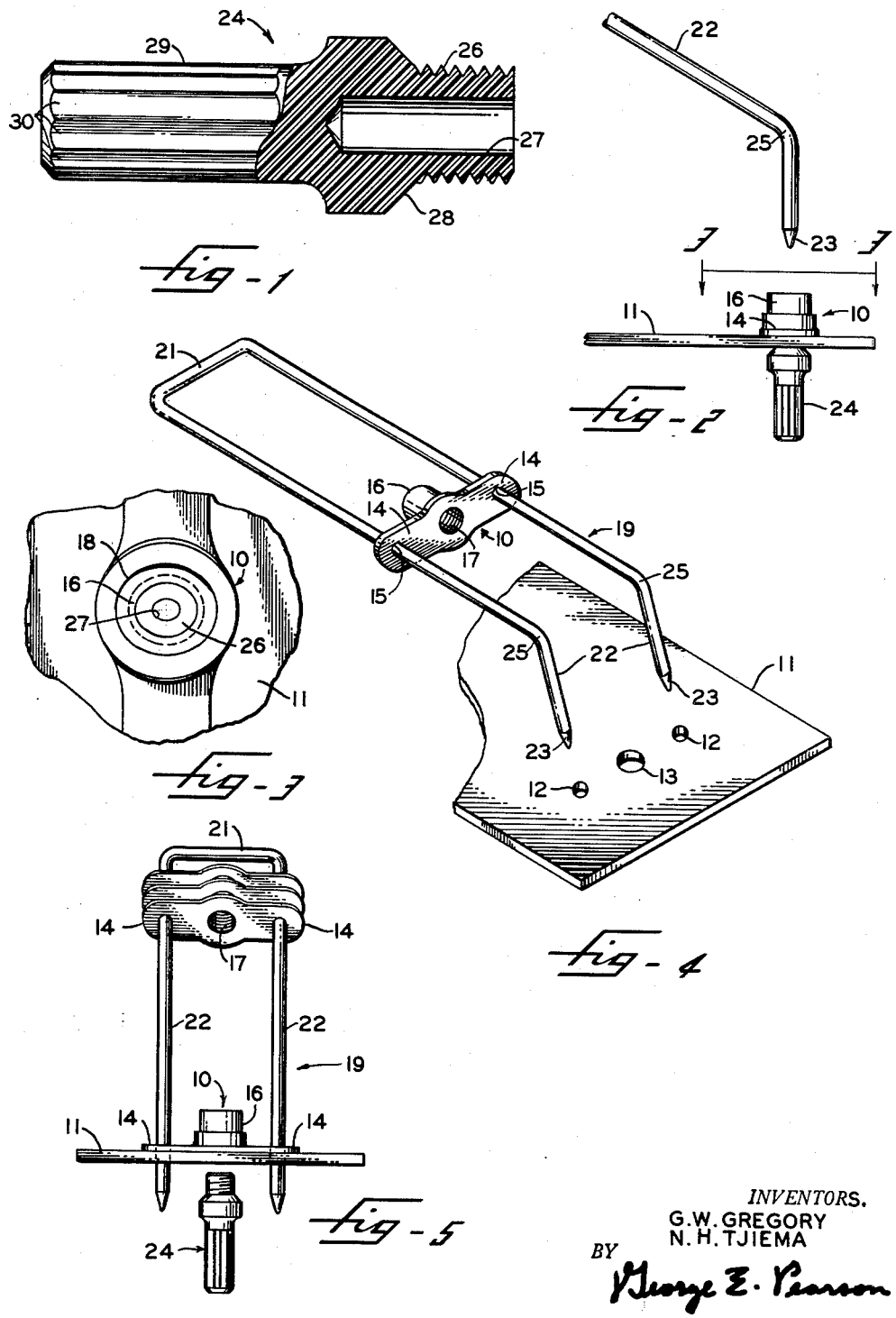
INVENTORS.
G.W. GREGORY
N. H. TJIEMA
BY
George E. Pearson
ATTORNEY

United States Patent Office 3,102,447
Patented Sept. 3, 1963

3,102,447
PLASTIC SCREW TYPE TEMPORARY FASTENER
FOR ANCHOR TYPE NUT PLATE OR THE LIKE
Gerrett W. Gregory, Chula Vista, and Norman H.
Tjiema, Lemon Grove, Calif., assignors to Rohr Corporation, a corporation of California
Filed Mar. 28, 1960, Ser. No. 17,966
1 Claim. (Cl. 85—1)

The present invention relates generally to temporary fasteners and more particularly to a screw-type fastener for temporarily securing an object such as an anchor type nut plate in place upon its support while its permanent fasteners are being applied to permanently affix the object to its support.

The fastener of the present invention has particular utility in holding an anchor type nut plate in place while the same is being permanently riveted to its support. It will be understood, however, that the fastener of the present invention is by no means limited to such use since it has general utility and applicability in temporarily securing any of a wide variety of devices in place while its permanent fasteners are being applied. For example, the temporary fastener of the present invention is well adapted for use in holding an oil pan in position beneath the cylinder block of an internal combustion engine preparatory to and during the permanent securing in place of the oil pan by the usual cap screws or bolts, the fasteners of the present invention, for this purpose, serving the same function as the studs 9 disclosed in Patent No. 1,921,379.

Referring again to its specific application to nut plates, the temporary fastener of the present invention preferably is formed of a suitable, pliable, yieldable material such as plastics, which are preferred, although in some instances a metal such as aluminum may be satisfactory. In any case, the fastener is so constituted as to engage the nut plate yieldably and thereby readily conform to the configuration of the threaded portion of the nut plate. To this end, the fastener is either pre-threaded or adapted for self-threading upon engagement with the threads of the nut plate and, in either case, is so constituted and constructed as to readily conform to the non-circular or elliptical shape of the threaded portion of the nut when the nut plate has this self-locking feature.

The nut plate fastener of the present invention also has provision for aligning the rivet holes of the nut plate with those of its support, this being accomplished by a tapered construction of the fastener per se or in cooperation with novel means for presenting the nut plate in hole-aligning position on the support preparatory to engagement of the nut plate by the fastener which is caused to approach the same from the other side of the support.

As envisioned in accordance with the principles and objects of the present invention, the nut plate fastener, as hereinafter more fully described with respect to the drawings, is in every respect a manually operated, hand manipulated device. To this end, the temporary fastener has a knurled or otherwise roughened portion which may be grasped between the fingers to rotate the fastener and thereby advance the same threadedly into the threaded portion of the nut plate, the corresponding portion of the fastener, as aforementioned, being self-threaded as the fastener is advanced into the nut plate, or partially or fully threaded, as the case may be. In any event, the fastener is so constituted and constructed as to withstand such rotary driving force of the fingers as is necessary to threadedly advance the fastener in the nut plate and to draw up the nut plate securely against the support. While being optimumly formed and constructed for these purposes, the inherently pliable, yieldable and resilient character of the fastener is preserved in adequate measure such that should the finger engaged portion of the fastener be inadvertently or accidently engaged with damaging force by the riveting tool during the riveting operation, the fastener will simply yield to such a blow and thus avoid transmission of the damaging force to the supporting structure for the nut plate.

An object of the present invention therefore is to provide a new and improved temporary fastener for nut plates and the like.

Another object is to provide a temporary nut plate fastener having provision for threadedly engaging, aligning, and securing an anchor type nut plate to its support upon simple manual manipulation of the fastener and having provision for avoiding damage to the nut plate support in the event of engagement of the fastener with the tool employed to apply the permanent fasteners.

Still another object is to provide a temporary fastener for anchor type nut plates which is compatible for use with cartridge or magazine type means for presenting the nut plates into hole-aligning position on the support.

Still other objects, features and advantages of the present invention are those inherent or to be implied from the novel composition, construction, and configuration of the parts of the fastener as will become more fully apparent as the description proceeds, reference being had to the accompanying drawings wherein;

FIG. 1 is a view partly in section, of the temporary fastener per se;

FIG. 2 is a view of the temporary fastener shown in securing relation with respect to a nut plate and its support;

FIG. 3 is a view of the nut plate, somewhat enlarged, as seen along the lines 3—3 of FIG. 2;

FIG. 4 is a view in perspective of the nut plate cartridge or magazine and illustrating use of the same in advancing a nut plate into position on a support therefor; and FIG. 5 is a view illustrating a nut plate positioned on its support by the cartridge preparatory to engagement of the nut plate by the temporary fastener.

Referring now to the drawings and first more particularly to FIGS. 2 to 5 thereof, there is shown thereon a conventional nut plate generally designated 10 which is to be secured as by rivets, not shown, to a support plate 11 having preformed rivet holes 12 and a central opening or clearance hole 13 for receiving a screw, not shown, which ultimately is to be used cooperatively with the nut plate to fasten an object, not shown, to the support 11. Nut plate 10 as shown, is formed of a single thin sheet of annealed heat treatable material to provide the ears or wings 14 on the plate portion of the nut plate, the ears 14 having the rivet holes 15 which are spaced in accordance with the spacing of holes 12 on the plate 11.

Nut plate 10 also has a locking nut portion 16 which, during the forming operation of the nut plate, is upset diametrically following tapping which produces the screw thread 17. The diametrical upsetting of the nut portion 16 produces the elliptical configuration 18, as seen in FIG. 3, to provide the self-locking feature of the nut. The nut plate is then heat treated with the result that the thin wall of the nut portion 16 becomes resilient and flexible and sufficiently yieldable to readily conform to the circular configuration of a bolt or screw which is threaded into the nut portion 16. The nut or bolt, as the case may be, is thus self-locked to the nut plate by reason of the yieldable gripping force developed by the nut as the same is converted by the bolt from its initial elliptical configuration to the cylindrical configuration of the bolt.

In accordance with a feature of the present invention, the nut plates as aforedescribed preferably are stored on a U-shaped cartridge or magazine device generally designated 19. Cartridge device 19 preferably is formed of pliable wire or the like with a preformed bight portion 21 so that the legs 22 are fairly precisely spaced in conformity with the spacing of the rivet holes 15 on the nut plate. Thus, when the pointed ends 23 of the legs 22 are inserted into the holes 12 of plate 11, the nut plates when stored on the cartridge device 19 as shown in FIG. 5 may be freely advanced along the legs 22 to bring the foremost nut plate into a position of alignment with the holes 12 and 13 on the plate 11. In practice, it is found that with the bight portion of cartridge device 19 held in the palm of one hand, the nut plate to be advanced along the legs 22 to the plate 11 may be grasped between the thumb and first finger and so advanced thereby for this purpose.

With the nut plate so held in position on the plate 11, as shown in FIG. 5, the temporary fastener of the present invention, generally designated 24, may be grasped between the fingers of the other hand, inserted through the hole 13, and then rotated and advanced threadedly into the nut 16 until the nut plate 10 is firmly drawn up against the plate 11 after which the cartridge device 19 may be removed by withdrawing the legs 22 from the aligned holes 12 and 15. In some cases the nature of the access of the cartridge 19 to the plate 11 may be such as to require various bends in the device 19 such as is shown, for example, at 25.

Referring now to FIG. 1, it will be seen that the fastener 24 is generally of cylindrical configuration and may readily be cast, molded, machined, or otherwise suitably formed. The fastener may be formed of aluminum or other suitable metal, but preferably for volume production may be cast from a suitable plastic such as polyethylene. The fasteners also may be made on an automatic screw machine using a suitable material, such, for example, as nylon.

The fastener comprises an end portion 26 which preferably is fully threaded to conform with the threads 17 in the nut 16, although it is to be understood that the threads may be only partly formed, that is to say, the depth of penetration of the thread into the cylindrical wall of end portion 26 may be quite shallow compared to the corresponding threads formed in the thin wall of nut portion 16 of nut plate 10, it being left to the latter threads to fully form those in the fastener 24 as end portion 26 is threadedly advanced into full engagement with the nut plate, as aforedescribed. In some cases it may be satisfactory to dispense entirely with threads initially on the end portion 26 of the fastener in which case the threads on the fastener may be fully formed by the act of screwing the same into the threaded portion of the nut plate. In any event, the material of which the fastener 24 is formed is sufficiently yieldable, pliable and resilient to fully accomplish the required threaded engagement between the fastener and the nut plate. In addition to the required threaded engagement, end portion 26 of the fastener must also be capable of such deformation as will enable the same to take on the elliptical configuration 18 of the nut portion of the nut plate. To this end, end portion 26 preferably is provided with a central opening 27 which, in the case of the machined nylon fastener as disclosed in FIG. 1, is in the form of a cylindrical bore. It will be appreciated that the size of bore 27 may be chosen in relation to the material of which the fastener 24 is composed such that the cylindrical wall of end portion 26 may be sufficiently thinned to enable the end portion of 26 to deform readily to the elliptical shape of the nut portion 16.

End portion 26 of the fastener terminates in an outwardly tapering portion 28 which serves to center the fastener in the hole 13 in the plate 11 as the fastener and nut plate become fully tightened or drawn up in opposing relation to the plate 11. This tapered portion and the remaining intermediate portion of the fastener has a larger diameter than threaded end portion 26 and hence serves as a shoulder against plate 11 to limit the threaded advance of the fastener into the nut plate.

Fastener 24 also has a handle portion 29 which has a suitably roughened or irregular surface to facilitate the manual rotation of the fastener to the extent required to threadedly advance the fastener in the nut plate. To this end, the handle portion 29 is preferably straight knurled as indicated at 30 but may be diamond knurled or otherwise scored or surface treated for the purpose aforementioned.

When the fastener 24 and the nut plate 10 have been fully engaged as aforedescribed, the cartridge device 19 may then be withdrawn which leaves the parts in the position as shown in FIG. 2. It is then customary to advance the rivets first through the holes 15 in the nut plate and thence through the holes 12 in the support plate 11 with the result that the heads of the rivets are on the nut plate side of plate 11 and the opposite ends of the rivets are upset on the fastener side of the support plate. This being the case, were the riveting tool to inadvertently strike the fastener 24, the force of the blow would not be transmitted to the plate 11 to thus posibly damage the same as has occurred in the past where rigid conventional screw fasteners have been employed. Such damage is avoided by reason of the fact that the fastener 24 being formed of relatively resilient material simply yields to the blow of the riveting tool thereon and thus absorbs the force. When the riveting is completed, the fastener may be removed and used again and again in the manner aforedescribed to fasten other nut plates generally in the same manner as heretofore set forth.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claim and all changes which come within the meaning and range of equivalency of the claim are intended to be embraced therein.

Having thus described our invention what we claim as new and useful and desire to secure by Letters Patent is:

A temporary fastener for use with an anchor-type nut plate having an elliptically shaped self-locking threaded nut portion, said fastener having a generally cylindrical configuration, an end portion adapted to be gripped between the finger tips for rotation of the fastener about its axis by manipulation of said end portion between the finger tips, an opposite externally threaded end portion adapted to be threadedly advanced into said nut portion of the nut plate in response to said rotary movement of the fastener relative to the nut plate, said threaded end portion having a central axial opening and resultant thin wall of tubular configuration to promote yieldability and conformability of the threaded end portion with the elliptical portion of the nut plate, and an intermediate portion which is enlarged relative to said end portions and of diameter sufficiently greater than that of said threaded end portion to restrict the advance of the fastener relative to an object having an opening through which the threaded end portion is advanced to engage said nut portion of the nut plate, said manipulatable end portion having a noncircular surface to facilitate gripping of the same between the finger tips and to promote said rotary movement therebetween, said fastener being formed of synthetic plastic material sufficiently pliable, yieldable, and resilient such that said thread engageable end portion readily yields and conforms to the configuration of said elliptical portion of the nut plate, said material affording sufficient rigidity and strength to said fastener to transmit from said manipulatable end portion to said thread engaging end portion adequate rotary force to effect said threaded advance and to clamp said nut plate to said object, said material affording sufficient resilience to said manipulatable end portion to enable the same to yield and absorb an otherwise potentially damaging blow inadvertently received from means employed to permanently fasten the nut plate to said object, said enlarged intermediate portion having a surface which tapers outwardly from said threaded end portion and merges with the remaining cylindrical surface of said intermediate portion, said tapered surface upon engagement with said opening in said object serving to center said nut portion of the nut plate with said opening and to align the corresponding openings in said nut plate and object for receiving permanent fastening means for the nut plate.

References Cited in the file of this patent

UNITED STATES PATENTS

| | | |
|---|---|---|
| 80,299 | Martin | July 28, 1868 |
| 1,109,094 | Weckbaugh | Sept. 1, 1914 |
| 1,311,128 | Kilgour | July 22, 1919 |
| 1,569,533 | Bilgery et al. | Jan. 12, 1926 |
| 1,815,821 | Baker | July 21, 1931 |
| 1,838,134 | Cozzens | Dec. 29, 1931 |
| 1,855,482 | McArthur | Apr. 26, 1932 |
| 1,921,379 | Bailey | Aug. 8, 1933 |
| 2,121,937 | Tichota et al. | June 28, 1938 |
| 2,155,498 | Laudensack | Apr. 25, 1939 |
| 2,704,357 | Johnson | Mar. 15, 1955 |
| 2,890,845 | Kiekhaefer | June 16, 1959 |
| 2,927,497 | Rapata | Mar. 8, 1960 |